March 15, 1927.

W. C. MILLS

RECEPTACLE CLOSURE

Filed March 21, 1925

1,620,825

Inventor:
Wallace C. Mills,
By Lindahl, Parker & Carlson
Attys.

Patented Mar. 15, 1927.

1,620,825

UNITED STATES PATENT OFFICE.

WALLACE C. MILLS, OF ROCKFORD, ILLINOIS, ASSIGNOR TO J. L. CLARK MANUFACTURING CO., OF ROCKFORD, ILLINOIS, A CORPORATION OF ILLINOIS.

RECEPTACLE CLOSURE.

Application filed March 21, 1925. Serial No. 17,261.

My invention relates to closures for receptacles for containing rubber mending materials and the like, and has particular reference to receptacle closures having cutting means or other useful tools secured to their outer surfaces.

Cutting or abrading means are commonly formed on the surfaces of receptacles for tire repair kits to provide a ready means for roughening the rubber to be mended before the patch is applied. Heretofore, abrasive surfaces have been formed on such containers by cementing abrasive particles directly to the surface of the container or by perforating a portion of the metal of the container to leave sharp edges protruding from the outer surface. One disadvantage of the first method is that the particles are apt to be easily rubbed off the metal surface in service. The second method does not provide a sealed closure for the receptacle, and allows the gummed patches and cement contained therein to dry out by exposure to air and thereby become worthless.

It is the primary object of this invention to provide a simple and improved closure for receptacles for tire repair kits, the closure having a separate abrading element securely attached to its outer surface.

A more specific object is to provide a novel means for clamping a cutting element or other useful tool upon a sheet metal surface, said means comprising a flange spun or die pressed from the metal of the closure and adapted to overlap the edges of the cutting element.

Further objects and advantages will become apparent from the following detailed description.

In the accompanying drawings Figure 1 is a perspective view of a container provided with a cover constructed according to my invention.

Figure 1:
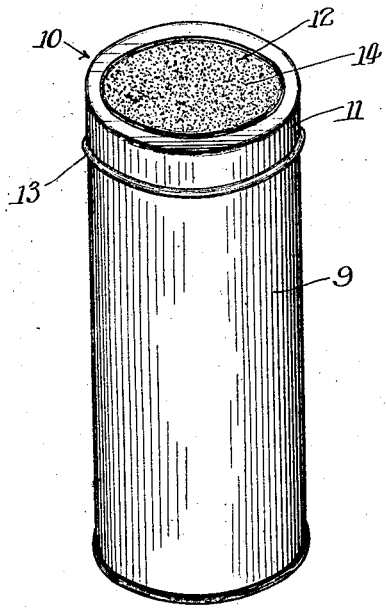

Referring to the embodiment of the invention illustrated in the drawings, 9 represents the body of a receptacle or can which is adapted to contain tire mending materials and the like, and 10 designates a cover for the can. To provide an air-tight closure for cans of this kind, the covers are usually drawn from a single piece of sheet metal and are formed with a peripheral skirt 11 and a top wall 12. The skirt is adapted to fit snugly over the open end of the body, and abuts against a beaded shoulder 13.

Figure 2:
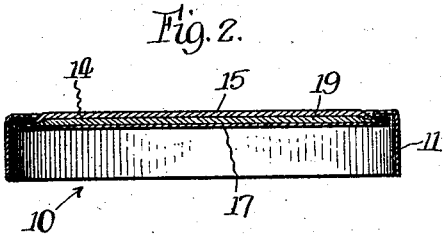
Fig. 2 is a vertical sectional view of the cover shown in Fig. 1.
Figure 4:
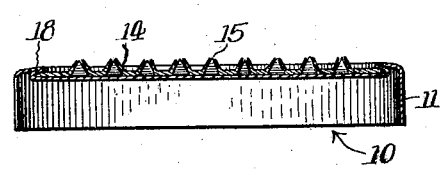
Fig. 4 is a sectional view of a cover provided with a different form of abrading element.
Figure 3:
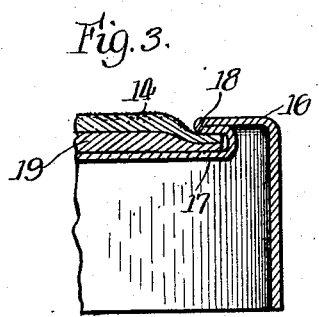
Fig. 3 is an enlarged fragmentary view of the construction shown in Fig. 2.
Figure 5:
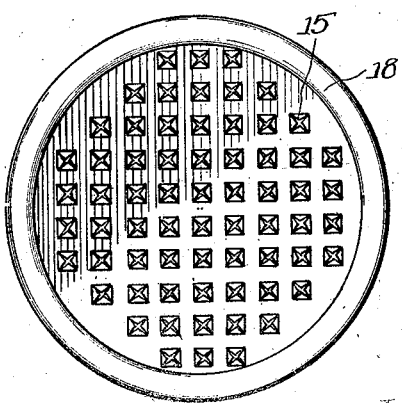
Fig. 5 is a plan view of the cover shown in Fig. 4.

Mounted on the top 12 of the cover is a tire repairing accessory herein shown as a disk 14 having a suitable abrasive surface 15. Such a disk may comprise a piece of coarse emery cloth or paper (Figs. 1 to 3), or a perforated metal plate (Figs. 4 and 5) having sharp protruding edges which constitutes the abrading or cutting surface.

Means is provided for clamping the disk 14 against the outer surface of the cover. To this end, the top wall 12 of the cover has its central portion drawn inwardly to form a shallow circular recess 16 having a bottom 17 of substantially the same diameter as the disk 14. The disk is held in the recess 16 by an inturned circular flange 18 which overlies the periphery of the bottom portion 17 and overlaps the edge of the disk. In the present instance the flange 18 is formed in the top wall 12 about the recess 16, the metal being doubled upon itself and the loop thus formed being bent inwardly. After the disk 14 has been seated in the recess 16, the flange 18 and the portion 17 are pressed together, thereby firmly clamping the disk between them.

Figure 6:
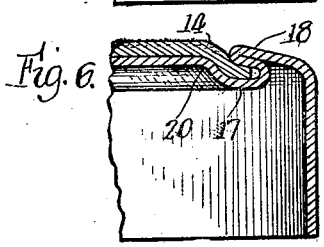
Fig. 6 is a modified form of the construction shown in Fig. 3.

When abrasive cloth or paper is used as the cutting element, a suitable backing pad 19 is placed beneath the disk 14 so as to raise the major portion of its abrasive surface 15 above the top of the flange 18. In the present instance, the pad 19 is made of substantially the same size as the disk 14. The peripheral edges of the pad 19 and abrasive disk 14 are squeezed together and reduced in thickness when the flange 18 and the cover portion 17 are pressed together, so that the central portion of the abrasive surface 15 projects above the top of the flange 18. To avoid the use of the pad 19, the portion 17 of the cover can be formed with a central raised portion 20 as shown in Fig. 6.

It will be apparent that the cover 10 and the abrasive disk 14 attached thereto constitute a cutting tool of convenient form. Such a cover is particularly adapted for use on containers for tire repair kits and the like where an abrading element constitutes one of the repair accessories and where the materials must be tightly enclosed to prevent deterioration. In this construction abrasive cloth, which is the preferred form of abradant for roughening the rubber surfaces, can be better and more permanently secured to the cover than would be possible by using glue or other adhesive.

While I have shown and described the preferred embodiments of the invention with considerable particularity for purposes of illustration and as applied to the cover of a receptacle, it is to be understood that I do not thereby intend to limit the invention to the specific form disclosed but aim to cover all other forms falling within the scope of the appended claims.

I claim as my invention:

1. A receptacle closure comprising, in combination, a sheet metal wall having a portion of its surface depressed inwardly to form a shallow recess and a peripheral flange, and a cutting element clamped against the bottom of said recess by said flange.

2. A receptacle closure comprising, in combination, a sheet metal wall having a depression in its surface, an abrasive disk in said depression, a flange projecting over the peripheral edge of said disk so as to clamp it against the bottom of said depression, and means raising the major portion of the abrasive surface of said disk above the top of said flange.

3. A receptacle closure comprising in combination, a sheet metal wall, a separate abrading element on the outer surface of said wall, and means for clamping said element to said wall, said means being formed from the metal of said wall and overlapping the edges of said element.

4. A cover for receptacles having in combination, a circular top wall, a circular flange formed at the periphery of said wall and overlying a portion thereof, and an abrasive disk positioned on said wall and having its peripheral edge clamped between said flange and said wall.

5. A receptacle closure comprising, in combination, a sheet metal wall having a portion of its surface depressed inwardly to form a shallow recess and a peripheral flange overlying said recess, and an abrasive carrying disk having its peripheral edge clamped against said depressed portion by said flange, said depressed portion having a central raised portion which serves to position part of said disk above the top of said flange.

In testimony whereof, I have hereunto affixed my signature.

WALLACE C. MILLS.